United States Patent Office 3,232,058
Patented Feb. 1, 1966

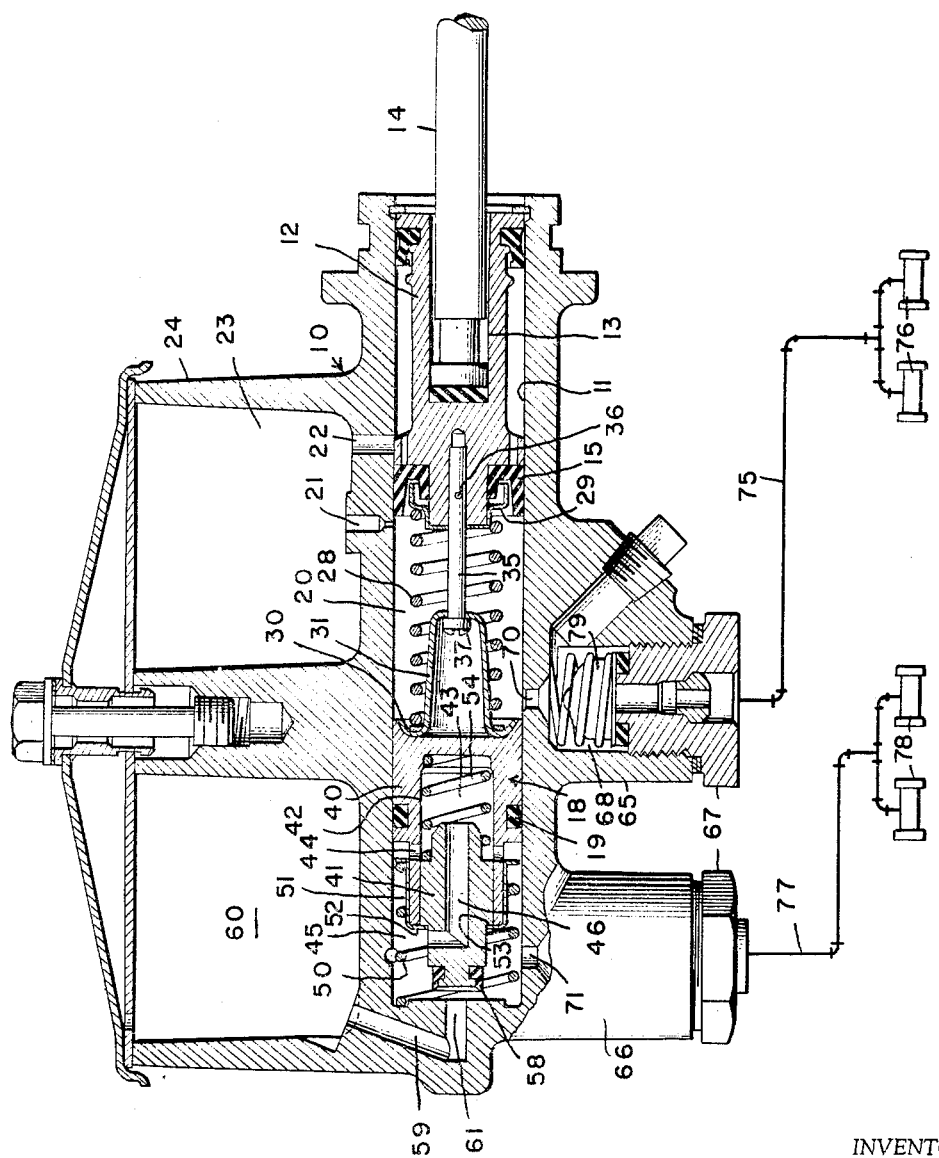
INVENTOR
DAVID T. AYERS JR.
BY John F. Phillips
ATTORNEY

3,232,058
MASTER CYLINDER
David T. Ayers, Jr., Birmingham, Mich., assignor to Kelsey-Hayes Company, Romulus, Mich., a corporation of Delaware
Filed Aug. 9, 1962, Ser. No. 215,928
4 Claims. (Cl. 60—54.6)

This invention relates to a vehicle master cylinder, and more particularly to a dual output master cylinder having separate chambers from which hydraulic fluid is displaced to the front and rear brake cylinders of a motor vehicle.

It is becoming the more or less general practice to provide vehicle master cylinders with two pistons defining two separate pressure chambers, one of which is connected to the front wheel cylinders, and the other of which is connected to the rear wheel cylinders. Such an arrangement is highly advantageous for the reason that the rupturing of one hydraulic fluid line still permits the generation of pressure in the other fluid line and the wheel cylinders associated therewith.

As a rule, such a mechanism provides a master cylinder bore in one end of which is arranged a pedal-operable plunger or piston, the two pistons defining therebetween a pressure chamber connected to one set of wheel cylinders. A floating piston defines with the adjacent end of the cylinder bore, a second chamber communicating with the one set of wheel cylinders.

A spring biases the floating piston toward the pedal-operable piston, and an intermediate spring is arranged between the two pistons to urge them away from each other.

Generally, the first mentioned spring is the stronger of the two, and biases the floating piston to a normal off position, the weaker intermediate spring biasing the pedal-operable piston to off position. As a result, operation of the brake pedal moves the associated piston to build up pressure in the adjacent chamber to displace fluid into the wheel cylinders connected thereto, the pressure in such chamber then effecting movement of the floating piston. This slightly increases the pedal travel, since some movement of the pedal must take place before the floating piston starts to move.

An important object of the present invention is to provide a master cylinder of the general type referred to wherein initial movement of the two pistons takes place simultaneously, thus somewhat reducing the total pedal travel.

A further object is to provide such a device wherein the intermediate spring is somewhat stronger than the biasing spring for the floating piston so that the stronger spring, upon initial movement of the brake pedal, immediately effects movement of the floating piston, thus simultaneously starting the building up of pressure in all of the wheel cylinders.

A further object is to provide novel means for connecting the stronger intermediate spring to the pedal-operable piston, and for transmitting forces from such spring to the floating piston, such novel means serving to limit expansion of the stronger spring to normally prevent such spring from moving the floating piston beyond its normal off position.

A further object is to provide a novel spring mounting of the character referred to which serves in the event of failure of pressure in the associated pressure chamber, to transmit positive pedal forces to the floating piston to operate the wheel cylinders which are dependent for their pressure on operation of the floating piston.

A further object is to provide in such a combination of elements a novel type of floating piston initial movement of which closes a replenishing port, whereupon further movement of the body of the floating piston promptly generates pressure in the associated pressure chamber.

A further object is to provide in such a mechanism a two-part floating piston, one element of which generates pressure in the associated chamber and the other element of which serves to close communication of the associated chamber with the replenishing port which normally communicates with the associated chamber when the brake pedal is released.

A further object is to provide such a floating piston having a novel arrangement of the two elements referred to in combination with a spring seat, which serves to transmit biasing spring forces to the pressure generating element of the floating piston and to limit movement relative thereto of the other element, so that the latter element normally opens the fluid replenishing port, but moves into engagement therewith to close such port upon initial movement upon the floating piston as a whole.

Other objects and advantages of the invention will become apparent during the course of the following description.

In the drawing I have shown one embodiment of the invention. In this showing:

The figure is a vertical axial sectional view through the master cylinder, the connections to the wheel cylinders being diagrammatically shown.

Referring to the drawing, the numeral 10 designating a master cylinder body as a whole, having an elongated bore 11 therein in one end of which is arranged a main piston or plunger 12, having a recess 13 extended axially therein to receive the adjacent end of a conventional push rod 14 connected to the usual brake pedal (not shown). The plunger 12 is provided with the usual sealing cup 15.

Axially spaced from the plunger 12 is a floating plunger 18 sealed in the bore 11 by an O-ring. The floating plunger will be further described in detail below. The space between the two plungers forms a pressure chamber 20, to which replenishing fluid flows through a port 21, arranged just in advance of the sealing cup 15 when the latter is in the off position shown in the drawing. The space back of the ceiling head of the plunger 12 is maintained full of fluid through a port 22, the ports 21 and 22 being supplied with fluid from a reservoir 23, formed by upstanding walls 24 of the body 10.

The plungers 12 and 18 are biased away from each other by a compression spring 28. One end of this spring engages a spring seat 29, which serves also to prevent displacement of the seal 15. The other end of the spring engages a curved flange 30, formed on an elongated spring seat 31, formed as a surface of revolution and preferably slightly conical as shown. A limiting rod 35 has one end extended into the plunger 12 and connected thereto as at 36. The other end of the rod 35 extends through the adjacent end of the spring seat 31 and is provided with a head 37, engaging the spring seat 31 to limit movement of the latter away from the plunger 12. The flange 30 engages the adjacent end of the plunger 18, as shown.

The floating piston or plunger 18 is made up of two relatively axially movable elements, 40 and 41, the latter of which is slidable in a bore 42 in the element 40. This bore provides, with the element 41, a chamber 43, communicating through a port 44, with a pressure chamber 45 formed between the plunger 18 and the adjacent end of the bore 11. The chambers 43 and 45 are also connected by a passage 46 through the plunger element 41.

A spring 50 is arranged in the chamber 45 and engages at one end with the adjacent end of the bore 11. The other end of this spring engages against the external flange of a cylindrical spring seat 51, surrounding the end of the element 40. The left-hand end of the spring seat 51 turns inwardly as at 52 and engages an annular shoulder 53 formed on the plunger element 41. A spring 54, in the chamber 43, biases the element 41 to its limit of movement to the left to engage the shoulder 53 with the flange 52.

It will become apparent that the spring 50 biases the plunger 18 into engagement with the flange 30, and the position of this flange is determined by engagement of the head 37 with the spring seat 31. The spring 28 is stronger than the spring 50, but has its expansion limited by the spring seat 31, the parts thus normally occupied in positions shown in the drawings.

The left-hand end of the plunger element 41 carries a resilient valve 58 normally spaced, as shown, from the adjacent end wall of the bore 11. The body 10 is provided with a passage 59 communicating at its upper end with a second reservoir 60, and having its lower end communicating with a port 61, opening into the chamber 45 and normally uncovered by the valve 58.

The chambers 20 and 45 are suitably connected to the wheel cylinders of the vehicle. For example, the body 10 may be provided with integral bosses 65 and 66, each of which is closed by a plug 67, and each of which has a chamber 68 therein. The chamber 68 of the boss 65 communicates with the chamber 20 through a port 70, while the chamber of the boss 66 communicates with the chamber 45 through a port 71.

The chamber 68 of the boss 65 is shown in communication with one end of the hydraulic line 75, the other end of which leads to the rear wheel brake cylinders 76. The chamber 68 of the boss 66 communicates through a hydraulic line 77 with the front wheel brake cylinders 78. Each of the chambers 68 is provided with a conventional residual pressure valve 79.

*Operation*

As stated, the parts of the mechanism normally occupy the positions shown in the drawing. When the brakes are to be applied, the pedal is depressed in the usual manner to move the push rod 14 to the left to actuate the plunger 12. Since the spring 28 is stronger than the spring 50, the plunger 18 also will be initially moved to generate pressure in the chamber 45. Also, the spring 28 will be compressed, and accordingly, pressure will be built up in the chamber 20, pressures in the chamber 20 and 45 being substantially equal.

Upon initial operation of the plunger 12, the replenishing port 21 will be closed by the seal 15, thus providing for the building up of pressure in the chamber 20. Initial movement of the plunger 18 moves the valve 58 to close the port 61, and beyond this point the plunger element 40 slides over the element 41 to generate pressure in the chamber 45, the spring 54 maintaining the valve 58 in a closed position. The inner end of the bore 42 forms part of the pressure generating area of the plunger element 40, as will be understood.

It will be apparent that fluid under pressure from the chamber 20 flows through the port 70 into the associated chamber 68, past the residual pressure valve 79, and thence through line 75 to the rear wheel cylinders 76 to apply the rear brakes. Similarly, fluid under pressure flows from the chamber 45 through port 71, past the associated residual pressure valve, thence through line 77 to the front wheel cylinders 78.

Obviously, since it is primarily the pressure in the chamber 20 which actuates the plunger 18, substantially the same pressures will be delivered to the front and rear wheel cylinders.

As the capacity of the chamber 20 is reduced, the head 37 moves away from the end of the spring seat 31 to whatever extent necessary. Similarly, the plunger element 41 moves relatively into the bore 42, the element 40 being free to move to reduce the capacity of the chamber 45, its movement being opposed only to a limited extent by the springs 50 and 54. When the brake pedal is released, pressure in the chambers 20 and 45 will drop. The spring 50 then moves the plunger 18 to the right. The drop in pressure in the chamber 20 releases the spring 28 to move the plunger 12 to the right relative to the spring seat 31, until the head 37 engages the end of the spring seat 31. Further expansion of the spring 28 is then prevented, and the plunger 12, spring 28 and spring seat 31 are then moved as a unit through the action of the spring 50, to move the plunger 12 to its normal limit of movement shown. Since the spring 20 is stronger than the spring 50, movement of the plunger 18 will be stopped by the flange 30 with the plunger element engaging such flange.

In the event pressure cannot be developed in the chamber 20, due, for example, to the rupturing of the line 75, operation of the push rod 14 will engage the left-hand end of the plunger 12 directly against the end of the spring seat 31, the rod 35 sliding into such spring seat. This establishes a positive mechanical connection between the plunger 12 and the plunger 18 to operate the latter. Thus pressure will be built up in the chamber 45 to apply the front wheel brakes.

If the line 77 should rupture or some other condition should arise through which pressure cannot be generated in the chamber 45, movement of the plunger 12 will transmit movement through the spring 28 to the plunger 18 to move it to the left until the left-hand end of the plunger element 40 engages the left-hand end of the bore 11. Movement of the plunger element 40 then will be arrested and further movement of the plunger 12 will generate pressure in the chamber 20 to apply the rear wheel brakes. Thus, the rupturing of one of the hydraulic lines still permits the operation of one pair of wheel cylinders.

Inasmuch as atmospheric pressure is present back of the seal 15, a cup type seal must be employed and such seal will close the port 21 upon initial movement of the plunger 12. Inasmuch as substantially the same pressures exist in the chambers 20 and 45, a simple substantially frictionless O-ring 19 may be employed to seal the plunger 18. Accordingly, the present device does not present friction perceptibly in excess of that present with conventional master cylinders. The O-ring, however, cannot be employed to close a replenishing port similar to the port 21, hence the use of the port 61 adapted to be closed by the valve 58. This valve is always closed immediately upon initial operation of the plunger 18, regardless of a pressure failure in the chamber 45. In the latter case, therefore, the closing of the valve 58 prevents fluid from moving from the chamber 45 into the reservoir 60. If a slow leak is present in the system associated with the chamber 45, pressure will be built up in such chamber as in the chamber 20, and the plunger element 40 may move to the left gradually during a brake application as determined by the extent of the leak, and there will be no appreciable loss in pressure from the chamber 20.

From the foregoing it will be apparent that the present mechanism provides a relatively simple and highly efficient means for separately generating braking pressures in the front and rear brake cylinders of a motor vehicle.

The use of the means for limiting expansion of the spring 28, permits the use of an intermediate spring stronger than the spring 50. Thus, pressure will be built up initially simultaneously in the chambers 20 and 45, thus appreciably reducing the total pedal travel. The spring seat 31 permits movement of the plunger 12 to mechanically operate the plunger 18 in the event of a failure of pressure in the chamber 20. The single simple spring seat 51 provides a seat for the right-hand end of the spring 50, while the flange 52 limits movement of the plunger element 41 to the left, so that when the plunger element 40 is in its normal off position shown, the valve 58 will be opened.

It is to be understood that the form of the invention shown and described is to be taken as a preferred example of the same and that various changes in the shape, size and arrangement of parts may be made as do not depart from the spirit of the invention or the scope of the appended claims.

I claim:

1. A motor vehicle master cylinder, comprising a body having an elongated bore, a pair of plungers slidable in said bore and spaced from each other to form therebetween a first pressure chamber, a first spring between and engaging said plungers and biasing them away from each other, a push rod extending into one end of said bore, and into engagement with one of said plungers to move it towards said other plunger to displace fluid from said first chamber, the other plunger forming with the other end of said bore a second pressure chamber, each of said pressure chambers having fluid connection with one pair of the vehicle wheel cylinders, said other plunger comprising two relatively axially movable elements, one of which is a fluid displacing element and the other of which carries a valve adjacent and normally spaced from the other end of said bore, means comprising a replenishing port communicating with said second chamber adjacent said valve, a second spring biasing said other element towards said port, means normally limiting such movement of said other element toward said port, whereby when said one element is moved by pressure in said one chamber to displace fluid from said second chamber, said valve will close and said one element will be movable relative to said other element to displace fluid from said second chamber, a third spring biasing said other plunger to a normal position in which said valve is open, said first spring being stronger than said third spring, means limiting expansion of said first spring to normally prevent said first spring from moving said other plunger in a fluid-displacing direction from said normal position, said one element being provided with an axial bore in which said other element is slidable, said other element and said axial bore forming a fluid chamber communicating with said second chamber, said second spring being arranged in said axial bore.

2. A motor vehicle master cylinder, comprising a body having an elongated bore, a pair of plungers slidable in said bore and spaced from each other to form therebetween a first pressure chamber, a first spring between and engaging said plungers and biasing them away from each other, a push rod extending into one end of said bore, and into engagement with one of said plungers to move it towards said other plunger to displace fluid from said first chamber, the other plunger forming with the other end of said bore a second pressure chamber, each of said pressure chambers having fluid connection with one pair of the vehicle wheel cylinders, said other plunger comprising two relatively axially movable elements, one of which is a fluid displacing element and the other of which carries a valve adjacent and normally spaced from the other end of said bore, means comprising a replenishing port communicating with said second chamber adjacent said valve, a second spring biasing said other element towards said port, means normally limiting such movement of said other element toward said port, whereby when said one element is moved by pressure in said one chamber to displace fluid from said second chamber, said valve will close and said one element will be movable relative to said other element to displace fluid from said second chamber, a third spring biasing said other plunger to a normal position in which said valve is open, said first spring being stronger than said third spring, means limiting expansion of said first spring to normally prevent said first spring from moving said other plunger in a fluid-displacing direction from said normal position, said means for limiting movement of said second element relative to said first element comprising a shoulder on said other element, and a spring seat surrounding a portion of said element and engaging one end of said second spring, said seat having a flange engaging said shoulder.

3. A motor vehicle master cylinder, comprising a body having an elongated bore, a pair of plungers slidable in said bore and spaced from each other to form therebetween a first pressure chamber, a first spring between and engaging said plungers and biasing them away from each other, a push rod extending into one end of said bore, and into engagement with one of said plungers to move it towards said other plunger to displace fluid from said first chamber, the other plunger forming with the other end of said bore a second pressure chamber, each of said pressure chambers having fluid connection with one pair of the vehicle wheel cylinders, said other plunger comprising two relatively axially movable elements, one of which is a fluid displacing element and the other of which carries a valve adjacent and normally spaced from the other end of said bore, means comprising a replenishing port communicating with said second chamber adjacent said valve, a second spring biasing said other element towards said port, means normally limiting such movement of said other element toward said port, whereby when said one element is moved by pressure in said one chamber to displace fluid from said second chamber, said valve will close and said one element will be movable relative to said other element to displace fluid from said second chamber, a third spring biasing said other plunger to a normal position in which said valve is open, said first spring being stronger than said third spring, means limiting expansion of said first spring to normally prevent said first spring from moving said other plunger in a fluid-displacing direction from said normal position, said one element being provided with an axial bore in which said other element is slidable, said other element and said axial bore forming a fluid chamber communicating with said second chamber, said second spring being arranged in said axial bore, said means for limiting movement of said other element relative to said one element comprising a second spring seat surrounding a portion of said one element and having an inturned annular flange, said other element having an annular shoulder engaging said flange, said second element having an external flange engaging one end of said second spring.

4. A motor vehicle master cylinder comprising a body having a bore therein, a pair of plungers in said bore spaced from each other to form a first pressure chamber therebetween, a first spring between and engaging said plungers and biasing them away from each other, means engaging one of said plungers to operate it, the other end of said bore forming with the other plunger a second chamber, a second spring in said second chamber biasing said other plunger toward said one plunger, each chamber having fluid connection with a pair of vehicle wheel cylinders, said second chamber having an end wall provided with a fluid replenishing port, said other plunger comprising a first element movable by pressure in said first chamber to generate pressure in said second chamber, said other plunger further comprising a second element movable axially relative to said one element, means for limiting movement of said second element relative to said first element toward said port, said second element having a valve movable to close said port when said second plunger is moved by a pressure in said first chamber, said other plunger having a normal position in which said valve uncovers said port, said first element being provided with an axial bore in which said second element is slidable, said second element and said axial bore defining a fluid chamber communicating with said second chamber, said means for limiting said movement of said second element relative to said first element comprising a spring seat member carried by said first element and having an external flange engaging one end of said second spring, said spring seat member having an inturned annular flange overhanging the end of said first element toward said port, said second element having an annular shoulder normally engaging said inturned flange.

References Cited by the Examiner
UNITED STATES PATENTS

| | | | |
|---|---|---|---|
| 1,943,886 | 1/1934 | Carroll | 60—54.6 |
| 2,732,918 | 1/1956 | Hackworth | 60—54.6 X |
| 3,060,691 | 10/1962 | Davis | 60—54.6 |
| 3,149,468 | 9/1964 | Shutt | 60—54.6 |

FOREIGN PATENTS

| | | |
|---|---|---|
| 716,008 | 9/1954 | Great Britain. |
| 859,911 | 1/1961 | Great Britain. |

SAMUEL LEVINE, *Primary Examiner.*

ROBERT R. BUNEVICH, JULIUS E. WEST,
*Examiners.*